United States Patent
Ozeki (10) Patent No.: US 12,530,017 B2
(45) Date of Patent: Jan. 20, 2026

(54) CONTROL DEVICE AND CONTROL METHOD

(71) Applicant: FANUC CORPORATION, Yamanashi (JP)

(72) Inventor: Shinichi Ozeki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 435 days.

(21) Appl. No.: 17/923,740

(22) PCT Filed: May 21, 2021

(86) PCT No.: PCT/JP2021/019348
§ 371 (c)(1),
(2) Date: Nov. 7, 2022

(87) PCT Pub. No.: WO2021/241436
PCT Pub. Date: Dec. 2, 2021

(65) Prior Publication Data
US 2023/0176544 A1    Jun. 8, 2023

(30) Foreign Application Priority Data

May 28, 2020  (JP) .................................. 2020-092861

(51) Int. Cl.
*G05B 19/4155*    (2006.01)
(52) U.S. Cl.
CPC ............... *G05B 19/4155* (2013.01); *G05B 2219/31449* (2013.01)
(58) Field of Classification Search
None
See application file for complete search history.

(56) References Cited

U.S. PATENT DOCUMENTS

2012/0029661 A1*  2/2012  Jones ............... G05B 19/41865
                                                       700/17
2017/0300035 A1* 10/2017  Kawai ............... G05B 19/409

FOREIGN PATENT DOCUMENTS

CN      106201499 A  * 12/2016
JP      2-309405        12/1990
(Continued)

OTHER PUBLICATIONS

Cams88, "MsgBox which shows path saved file—VBA", Mar. 2020, www.mrexcel.com, pp. 1-8 (Year: 2020).*
(Continued)

*Primary Examiner* — David Earl Ogg
(74) *Attorney, Agent, or Firm* — Wenderoth, Lind & Ponack, L.L.P.

(57) ABSTRACT

A control device is for controlling an industrial machine. The control device has a display control unit that divides a screen displayed on a display unit into a plurality of regions and displays representations, on the regions, concerning respective motion executions of the machine, a detection unit that, when a plurality of the representations are displayed in a combination, detects operation of a user on the machine or detects a time period in which a display pattern indicating the combination of representations has been displayed without change, and a saving unit that, when the detected operation is a predetermined operation having been set in advance or the display time period of the detected display pattern is equal to or longer than a predetermined time period having been set in advance, saves the display pattern when the detection has been performed as an intended display pattern.

6 Claims, 9 Drawing Sheets

(56) References Cited

FOREIGN PATENT DOCUMENTS

| | | | |
|---|---|---|---|
| JP | 5-104330 | | 4/1993 |
| JP | 2000-066709 | | 3/2000 |
| JP | 2000066709 A | * | 3/2000 |
| JP | 2004-272414 | | 9/2004 |
| JP | 2009-278153 | | 11/2009 |
| JP | 2009278153 A | * | 11/2009 |
| JP | 2010-152882 | | 7/2010 |
| JP | 2010152882 A | * | 7/2010 |
| JP | 2011155548 A | * | 8/2011 |
| JP | 2012-146324 | | 8/2012 |
| JP | 2013-123762 | | 6/2013 |
| JP | 2016-081456 | | 5/2016 |
| JP | 2016-112651 | | 6/2016 |

OTHER PUBLICATIONS

International Search Report issued Aug. 3, 2021, in International (PCT) Application No. PCT/JP2021/019348, with English translation.

* cited by examiner

FIG. 2

| DISPLAY ELEMENT | IDENTIFIER |
|---|---|
| DISPLAY ELEMENT REGARDING COORDINATE VALUES | A |
| DISPLAY ELEMENT REGARDING MOVEMENT AXIS DIRECTION | B |
| TABLE FOR WORKPIECE COORDINATES | C |
| DISPLAY ELEMENT REGARDING G CODE MODAL | D |
| DISPLAY ELEMENT FOR MDI PROGRAM EDITING | E |
| DISPLAY ELEMENT REGARDING FEED SHAFT SPEED | F |
| ⋮ | ⋮ |

231(1) DISPLAY PATTERN

| USER ID | REGION 111 | REGION 112 | REGION 113 | REGION 114 | REGION 115 | DISPLAY NAME |
|---|---|---|---|---|---|---|
| 100 | A | B | C | — | — | DISPLAY ELEMENT ABC |
| 100 | A | D | — | F | E | DISPLAY ELEMENT ADFE |
| 100 | A | D | — | C | E | DISPLAY ELEMENT ADCE |
| ... | ... | ... | ... | ... | ... | ... |

FIG. 9

CONTROL DEVICE AND CONTROL METHOD

TECHNICAL FIELD

The present invention pertains to a control device and a control method.

BACKGROUND ART

A control device that controls an industrial machine such as a machine tool or a robot divides a screen for a display device included in the control device into a plurality of regions, and, in each region, displays control information such as a current position for each operation shaft, a main shaft rotation number, or a feeding speed.

There is known a technique in which, when an operator is caused to select a combination of display items and display sizes, a plurality of divided screens corresponding to the selected display sizes are displayed, and a divided screen is designated by the operator, position information regarding the designated divided screen is stored in association with a display item selected by the operator and, based on the stored position information and display item, the display item is displayed in the divided screen at a position indicated by the position information, whereby it is possible to freely customize a configuration for a display screen in alignment with an intention of the operator. For example, refer to Patent Document 1.

Patent Document 1: Japanese Unexamined Patent Application, Publication No. 2010-152882

DISCLOSURE OF THE INVENTION

Problems to be Solved by the Invention

For example, even with the same preparatory work, there are cases where the work procedure, type and disposition of display elements used differ for each operator, with the problem that each operator needs to change screen setting each time preparatory work is prepared, which incurs time and effort.

Accordingly, it is desirable to display a screen that corresponds to an operator, without setting the screen each time preparatory work is performed.

Means for Solving the Problems (1) One aspect of a control device according to the present disclosure is a control device configured to control an industrial machine, the control device including: a display control unit configured to divide a screen to be displayed by a display unit into a plurality of regions, and respectively display display elements pertaining to execution of an operation by the industrial machine in the plurality of regions; a detection unit configured to, in a case of combining and displaying a plurality of display elements, detect a user operation with respect to the industrial machine or an amount of display time in which a display pattern indicating the combination of the plurality of display elements is displayed without change; and a saving unit configured to, in a case where the user operation detected by the detection unit is a predefined predetermined operation or in a case where the amount of display time detected by the detection unit for the display of the display pattern is equal to or greater than a preset predetermined amount of time, save, as a desired display pattern, the display pattern for a time at which detection was performed.

(2) One aspect of a control method according to the present disclosure is a control method for a display operation in a control device that is realized by a computer that includes a display unit and is configured to control an industrial machine, the control method including: dividing a screen to be displayed by the display unit into a plurality of regions, and respectively displaying display elements pertaining to execution of an operation by the industrial machine in the plurality of regions; in a case of combining and displaying a plurality of display elements, detecting a user operation with respect to the industrial machine or an amount of display time in which a display pattern indicating the combination of the plurality of display elements is displayed without change; and in a case where the detected user operation is a predefined predetermined operation or in a case where the detected amount of display time for the display of the display pattern is equal to or greater than a preset predetermined amount of time, saving, as a desired display pattern, the display pattern for a time at which detection was performed.

Effects of the Invention

By virtue of one aspect, it is possible to display a screen that corresponds to an operator, without setting the screen each time preparatory work is performed.

PREFERRED MODE FOR CARRYING OUT THE INVENTION

Description is given below regarding one embodiment, with reference to the drawings. Here, as preparatory work, an example is given for a case of automatically measuring coordinates for a workpiece after manually measuring coordinates for a workpiece that was disposed in a machine tool. Note that the present invention is not limited to preparatory work for manual measurement and automatic measurement of workpiece coordinates, and can also be applied to preparatory work for only manual measurement or automatic measurement of workpiece coordinates, or preparatory work that includes work other than measurement of workpiece coordinates.

In addition, a machine tool is given as an example of an industrial machine, and a numerical control device is given as an example of a control device. Note that the present invention is not limited to a machine tool, and can also be applied to, for example, an industrial robot, a service robot, etc. In this case, it may be that the control device is a robot control device, and the preparatory work includes, for example, teaching work for teaching an operation to the robot.

One Embodiment

Figure 1:
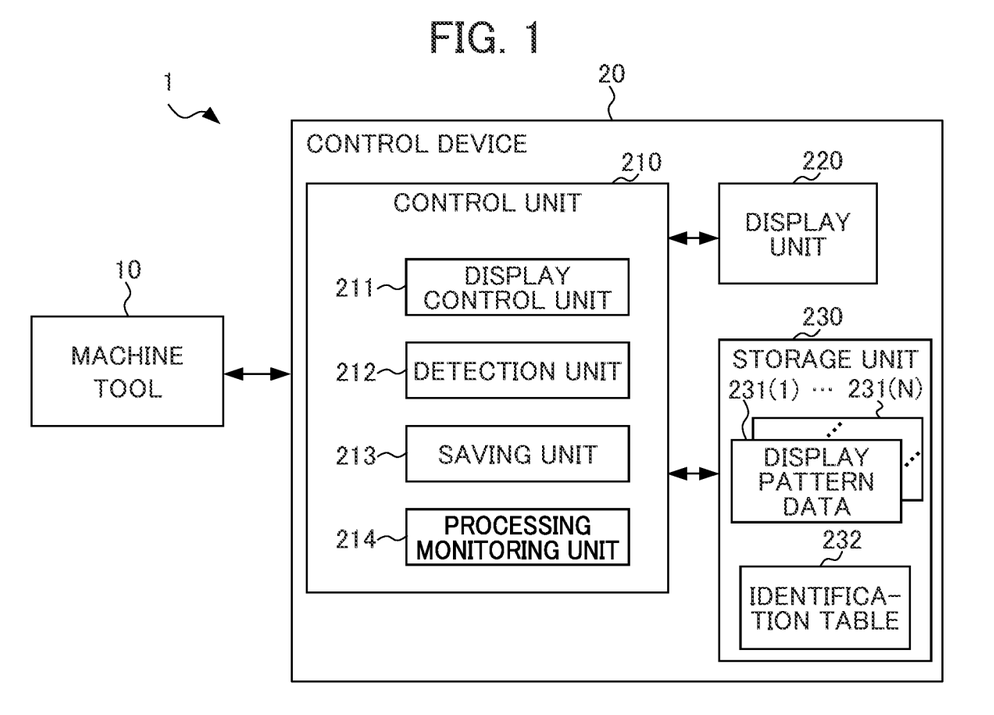
FIG. 1 is a functional block diagram illustrating an example of a functional configuration of a control system according to one embodiment.

FIG. 1 is a functional block diagram illustrating an example of a functional configuration of a control system according to one embodiment. As illustrated in FIG. 1, a control system 1 has a machine tool 10 and control device 20.

The machine tool 10 and the control device 20 may be directly connected to each other via a connection interface (not shown). Note that the machine tool 10 and the control device 20 may be connected to each other via a network such as a local area network (LAN). In this case, it may be that the machine tool 10 and the control device 20 are each provided with a communication unit (not shown) for communicating with each other via the corresponding connection.

Note that the control device 20 may be included in the machine tool 10.

The machine tool 10 is a machine tool that is publicly known to a person skilled in the art, and operates based on an operation command from the control device 20.

Control Device

The control device 20 is a numerical control device that is publicly known to a person skilled in the art. The control device 20 generates an operation command based on either an instruction, which is from an operator and was received via an input unit (not shown) such as a keyboard or a touch panel included in the control device 20, or a machining program that is executing. The control device 20 transmits the generated operation command to the machine tool 10. As a result, the control device 20 controls operation by the machine tool 10.

As illustrated in FIG. 1, the control device 20 has a control unit 210, a display unit 220, and a storage unit 230. The control unit 210 has a display control unit 211, a detection unit 212, a saving unit 213, and a processing monitoring unit 214. In addition, the storage unit 230 stores display pattern data 231(1) to 231(N), and an identification table 232 (N is an integer equal to or greater than 1).

Display Unit 220

The display unit 220 is a display device such as a liquid-crystal display (LCD) and, as described below, displays, based on a control instruction from the display control unit 211, a screen that includes a plurality of display elements that are disposed corresponding to an operator.

Storage Unit 230

It may be that the storage unit 230 is a read-only memory (ROM), a hard disk drive (HDD), etc., and stores various control programs as well as the display pattern data 231(1) to 231(N) and the identification table 232.

The display pattern data 231(1) to 231(N), for example, store for each operator a display pattern that are saved by the later-described saving unit 213 and indicate a combination of a plurality of display elements used in preparatory work. Note that the display pattern data 231(1) to 231(N) are described below.

Note that, in a case where it is not necessary to individually distinguish between each of the display pattern data 231(1) to 231(N), they are collectively referred to as "display pattern data 231".

As described below, the identification table 232, for example, stores an identifier for identifying various displays, such as a display element regarding coordinate values, a display element regarding a movement axis direction, a table for workpiece coordinates, a display element regarding G code modal, a display element for editing an MDI program, or a display element regarding feed shaft speed.

Figure 2:
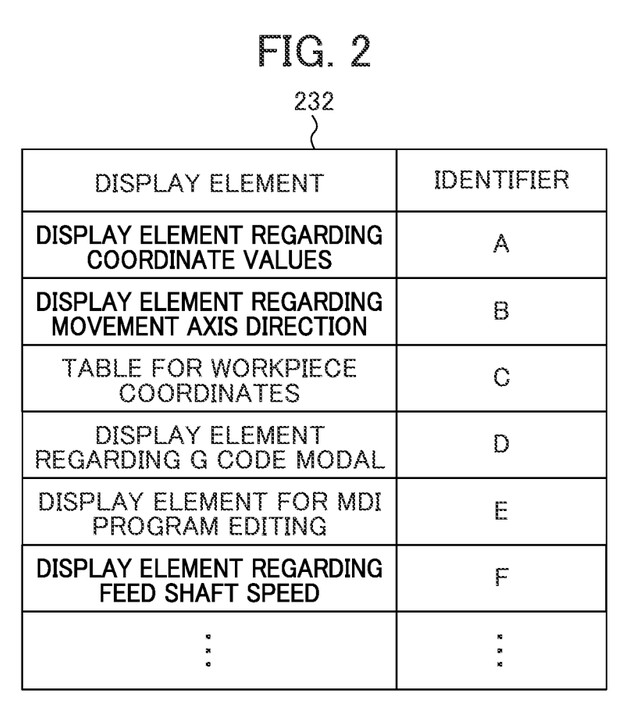
FIG. 2 illustrates an example of an identification table.

FIG. 2 illustrates an example of the identification table 232.

As illustrated in FIG. 2, for example the identification table 232 includes a "display element" pertaining to execution of an operation by the machine tool 10 used in preparatory work, and an "identifier" for identifying the "display element".

"Display element regarding coordinate values", "display element regarding movement axis direction", "table for workpiece coordinates", "display element regarding G code modal", "display element for MDI program editing", "display element regarding feed shaft speed", etc., which are used in preparatory work, may be stored within "display element" in the identification table 232.

For example, a predefined identifier such as "A" indicating "display element regarding coordinate values", "B" indicating "display element regarding movement axis direction", "C" indicating "table for workpiece coordinates", "D" indicating "display element regarding G code modal", "E" indicating "display element for MDI program editing", and "F" indicating "display element regarding feed shaft speed" may be stored within "identifier" in the identification table 232. Note that each identifier is set to a character, but may be a number or may be a combination of characters and numbers.

Control Unit 210

The control unit 210 is something publicly known to a person skilled in the art that has a central processing unit (CPU), a ROM, a random-access memory (RAM), a complementary metal-oxide-semiconductor (CMOS) memory, etc., with each of these configured to be able to mutually communicate via a bus.

The CPU is a processor that performs overall control of the control device 20. The CPU reads out, via the bus, a system program and an application program that are stored in the ROM, and controls the entirety of the control device 20 in accordance with the system program and the application program. As a result, as illustrated in FIG. 1, the control unit 210 is configured to realize functionality for a display control unit 211, a detection unit 212, a saving unit 213, and a processing monitoring unit 214. Various data such as temporary calculation data or display data is stored in the RAM. In addition, the CMOS memory is supported by a battery (not shown), and is configured as a non-volatile memory for which a storage state is held even if a power supply for the control device 20 is turned off.

Description is given below regarding a case in which, in preparatory work, an operator manually turns a handle (not shown) included in the machine tool 10 to move a main shaft (not shown), which is included in the machine tool 10 and to which is attached a touch sensor, and thereby manually measure coordinates for a workpiece displayed in the machine tool 10, and next uses an MDI program to automatically measure workpiece coordinates. In other words, description is given regarding a case in which, for example, workpiece coordinates are first manually measured for a portion for which an MDI program used in measurement is not prepared, and next uses a result of an MDI program used in measurement having been created and prepared previously to automatically measure workpiece coordinates for a remaining portion.

Note that preparatory work is not limited to manual measurement and automatic measurement of workpiece coordinates, and the same also applies to preparatory work for only manual measurement or automatic measurement of workpiece coordinates, or preparatory work that includes work other than measurement of workpiece coordinates.

The display control unit 211 divides a screen displayed by the display unit 220 into a plurality of regions, and, in each of the plurality of regions, displays a corresponding display element pertaining to operation execution by the machine tool 10.

Figure 3:
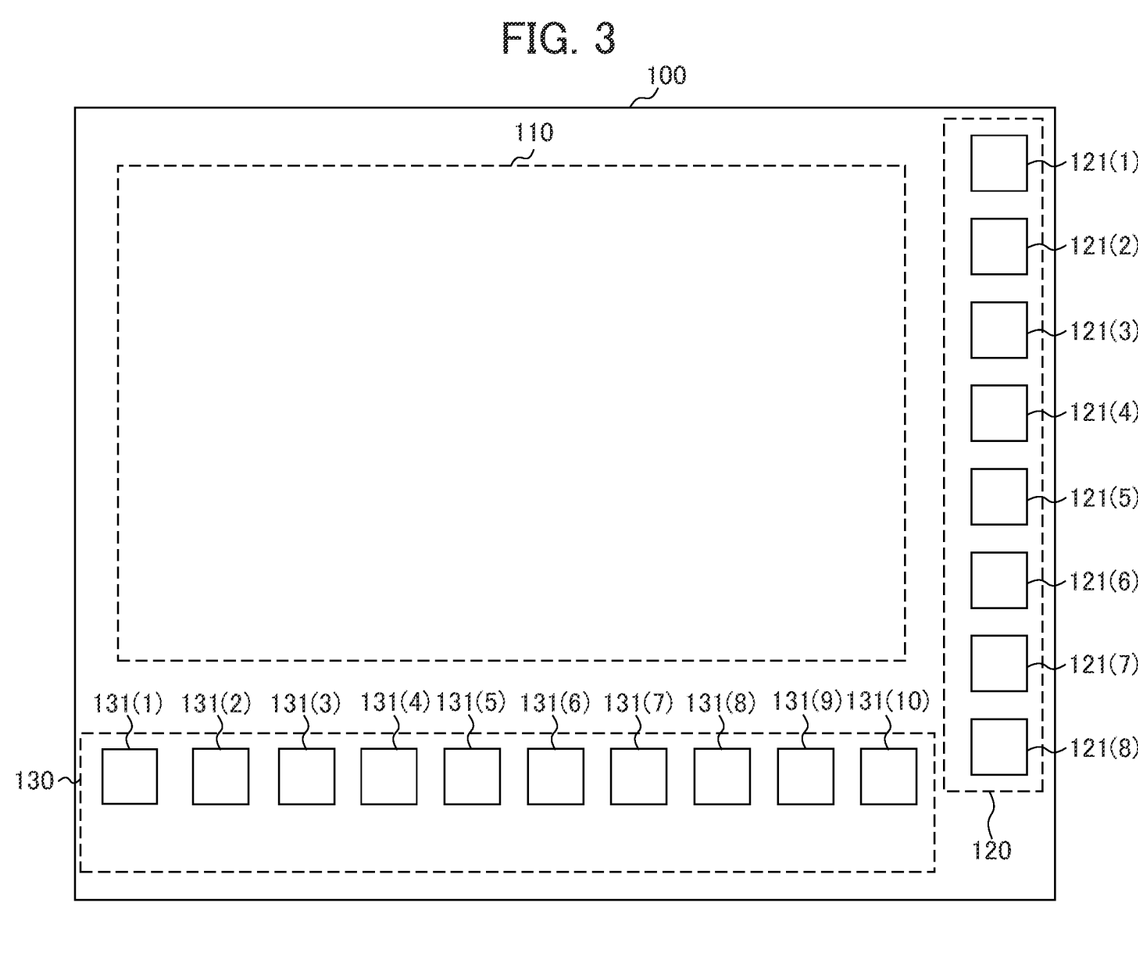
FIG. 3 illustrates an example of a screen.

FIG. 3 illustrates an example of a screen 100.

As illustrated in FIG. 3, the screen 100 has a region (hereinafter also referred to as a "display screen 110") for displaying display elements pertaining to operation execution by the machine tool 10 that have been selected by an operator, for example. In addition, the screen 100 has a region (hereinafter may be referred to as "vertical key display region 120") for displaying software keys 121(1) to 121(*m*) in a vertical row, and a region (hereinafter, may be referred to as "horizontal key display region 130") for displaying software keys 131(1) to 131(*n*) in a horizontal row. Note that m and n are positive integers. Note that an example was given for a case of displaying keys within the screen 100, but there is no limitation to this. It may be that the keys are not displayed within screen 100 and are provided as hardware keys.

Description is given below with m=8 and n=10, but operation is similar even when m is a number other than 8 and n is a number other than 10. In addition, in a case where it is not necessary to individually distinguish between each of the software keys 121(1) to 121(8), they may be collectively referred to as the "software keys 121". In addition, in a case where it is not necessary to individually distinguish between each of the software keys 131(1) to 131(10), they may be collectively referred to as the "software keys 131".

The display control unit 211, for example, divides the display screen 110 into a plurality of regions.

Figure 4:
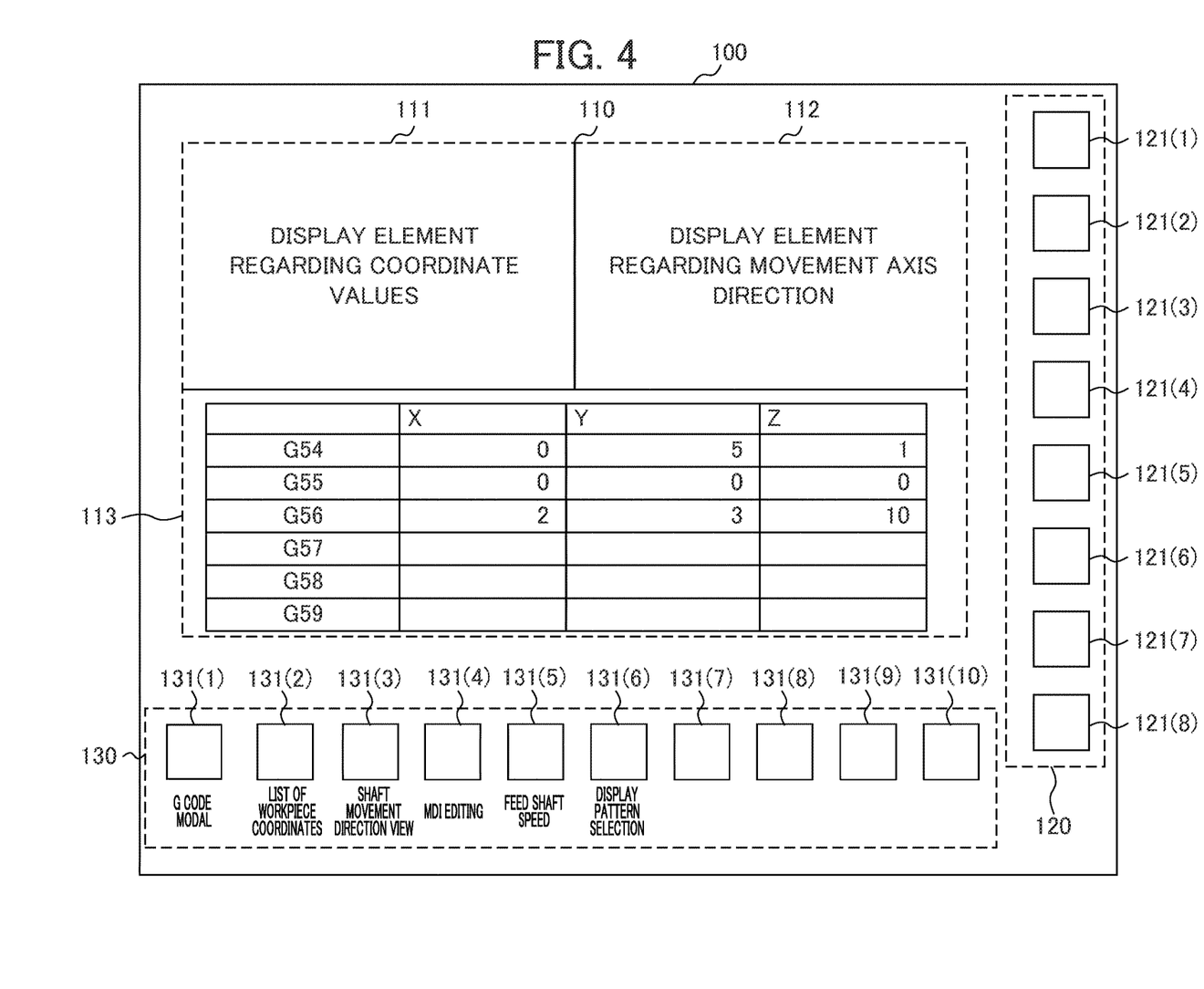
FIG. 4 illustrates an example of a screen in a case where workpiece coordinates are manually measured.

FIG. 4 illustrates an example of the screen 100 in a case where workpiece coordinates are manually measured.

As illustrated in FIG. 4, for example in a case of manually measuring workpiece coordinates, the display control unit 211, based on the operator operating the software keys 131, divides the display screen 110 into three regions 111, 112, and 113. Based on the operator operating the software keys 131, the display control unit 211 displays in the display unit 220 the screen 100 in which a display element regarding coordinate values is disposed in the region 111, a display element regarding movement axis direction is disposed in the region 112, and a table for workpiece coordinates is disposed in the region 113.

In addition, as illustrated in FIG. 4, for example the display control unit 211 may allocate to the software keys 131 functionality for switching each of the regions 111, 112, 113, etc. in the display screen 110 to a display element pertaining to operation execution by the machine tool 10, such as a G code modal, a list of workpiece coordinates, a shaft movement direction view, MDI editing, or a feed shaft speed. The display control unit 211 may also allocate, to the software keys 121, functionality for screen operations that respectively correspond to the display elements.

Note that functionality for screen operations may be allocated to the software keys 131, or functionality for switching display elements may be allocated to the software keys 121.

In addition, as illustrated in FIG. 4, for example functionality for display pattern selection may be allocated to the software key 131(6). As a result, in a case where an operator has pressed the software key 131(1), the display control unit 211, as described below, may use a list-format screen (not illustrated) to display, on the display unit 220, display names for display patterns each indicating a combination of a plurality of display elements that are saved in display pattern data 231 corresponding to the operator and are to be displayed on the display screen 110. In a case where the display screen 110 having the display pattern in FIG. 4, which is for manually measuring workpiece coordinates, is selected based on an operation with respect to the software keys 121 and 131 by the operator, the display control unit 211 may display the display screen 110 in FIG. 4 on the display unit 220.

In contrast, in a case where, based on an operation with respect to the software keys 121 and 131 by the operator, there is no desired display pattern for the operator, for example "new display pattern" or "cancel" is selected, the display control unit 211 may display, on the display unit 220, the display screen 110 having an initial state or the display screen 110 used in most recent preparatory work. In this case, the display control unit 211 may switch to the display screen 110 in FIG. 4 based on an operation with respect to the software keys 121 and 131 by the operator.

Figure 5:
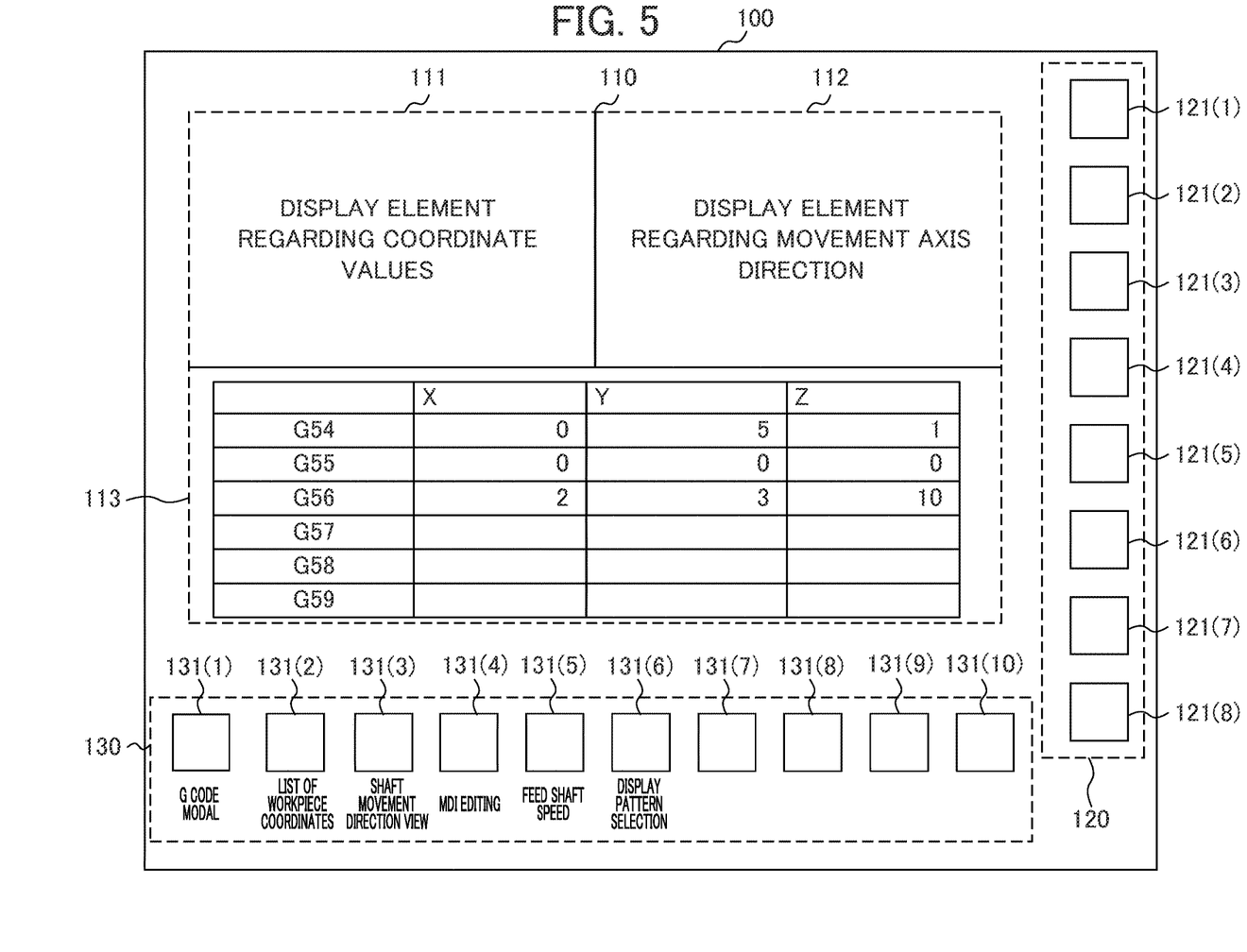
FIG. 5 illustrates an example of switching a display screen when going from manually measuring workpiece coordinates to automatic measurement, in preparatory work.
Figure 6:
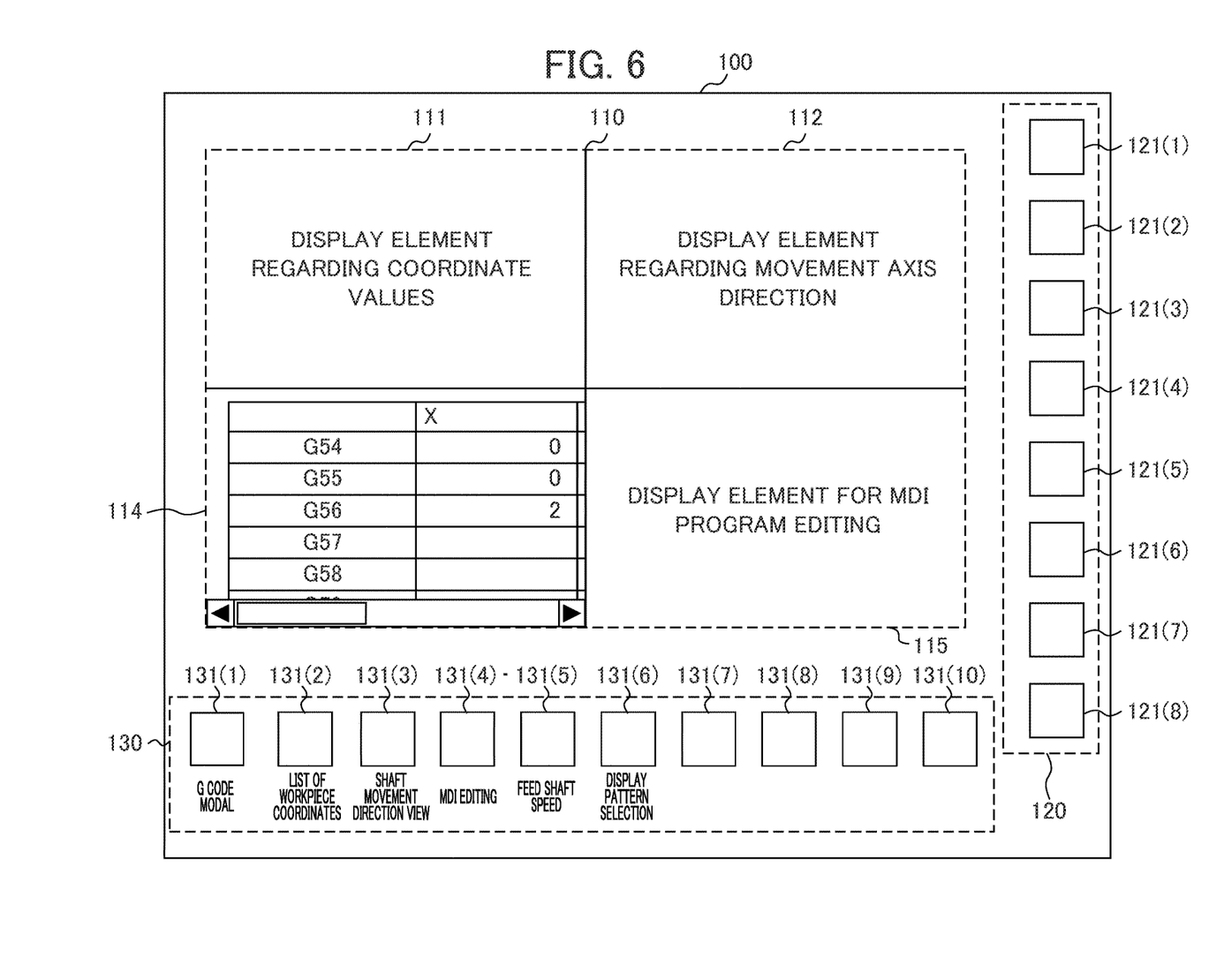
FIG. 6 illustrates an example of switching a display screen when going from manually measuring workpiece coordinates to automatic measurement, in preparatory work.
Figure 7:
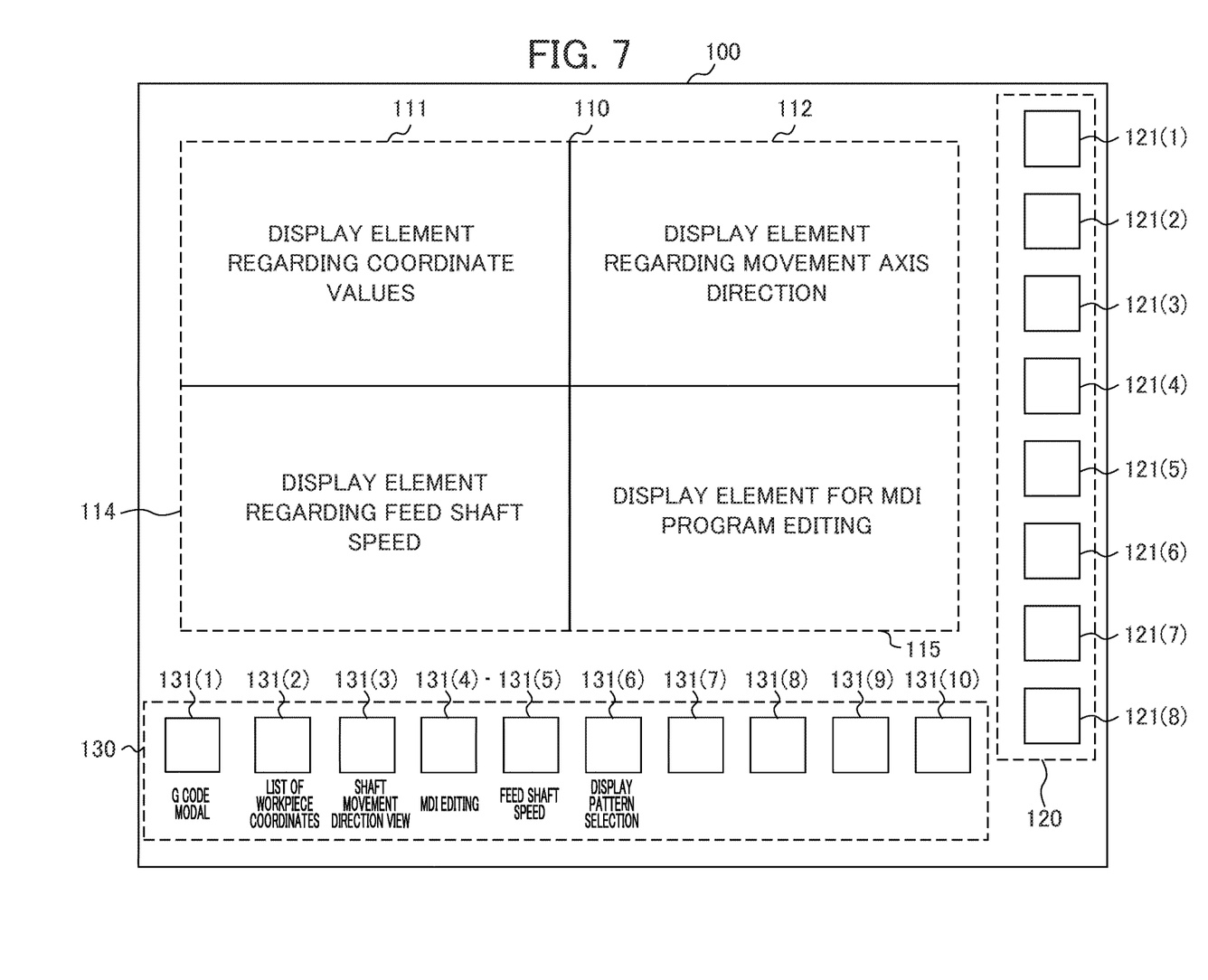
FIG. 7 illustrates an example of switching a display screen when going from manually measuring workpiece coordinates to automatic measurement, in preparatory work.

FIGS. 5 to 7 illustrate an example of switching the display screen 110 when going from manually measuring workpiece coordinates to automatic measurement, in preparatory work.

As illustrated in FIG. 5, for example, because an MDI program is executed in automatic measurement, it is necessary to view an executed G code modal, and thus the display control unit 211 switches the region 112 from a display element regarding movement axis direction to a display element regarding G code modal, based on an operation with respect to the software keys 131 by the operator.

Next, as illustrated in FIG. 6, for example in order to create or edit an MDI program in automatic measurement, the display control unit 211 divides the region 113 into a region 114 and a region 115 based on an operation with respect to the software keys 131 by the operator. Based on an operation with respect to the software keys 131 by the operator, the display control unit 211 displays a table for workpiece coordinates in the region 114 and displays a display element for MDI program editing in the region 115.

Note that, because the table for workpiece coordinates displayed in the region 114 is horizontally long, the display control unit 211 may display a scroll bar together with the table for workpiece coordinates.

Next, for example in a case where there is a desire to sufficiently confirm that an interfere accident will not occur in automatic measurement, based on an operation with respect to the software keys 131 by the operator, the display control unit 211 switches to a display element regarding a feeding speed in the region 114, as illustrated in FIG. 7. Afterwards, the control device 20 executes an MDI program based on an operation by the operator, whereby workpiece coordinates are automatically measured.

Here, the display element regarding coordinate values is essential in manual measurement and automatic measurement, in which the coordinate position of the main shaft (not shown) is confirmed based on a coordinate value for the touch sensor attached to the main shaft. In addition, the display element regarding movement axis direction is essential in manual measurement and is for confirming a direction of movement in a +X axis direction, −X axis direction, +Y axis direction, −Y axis direction, +Z axis direction, and −Z axis direction when the operator turns a handle (not shown) on the machine tool 10 to thereby move the main shaft (not shown). The display element regarding G code modal is essential in automatic measurement and is for confirming an executed G code modal because an MDI program is executed. The display element for MDI program editing is essential for automatic measurement and is for creating or editing an MDI program.

In contrast, the display element regarding feed shaft speed is an optional display element in automatic measurement and is displayed in a case of desiring to monitor the feed shaft speed such that an interference accident, etc. does not occur. The table for workpiece coordinates is a display element that is essential in manual measurement because it is necessary to input measured workpiece coordinates each time measurement is performed in manual measurement. However, the table for workpiece coordinates is an optional display element in automatic measurement because, due to how an MDI program is put together, it is possible for workpiece coordinates to be automatically inputted into a table for workpiece coordinates after measurement is performed in automatic measurement. Accordingly, there are cases where the display screen 110 in FIG. 6 is used to perform automatic measurement, depending on the operator.

For example, as illustrated in any of FIGS. 4 to 7, the detection unit 212 detects an operation by an operator with respect to the machine tool 10 in a case where a plurality of display elements such as display elements regarding coordinate values or a table for workpiece coordinates are combined and displayed on the display screen 110. In addition, for example it may be that, based on a clock signal from a clock (not shown) included in the control device 20, the detection unit 212 detects an amount of display time during which the display pattern in each display screen 110 from FIGS. 4 to 7 is displayed without change.

In a case where an operation which is by an operator and is detected by the detection unit 212 is a predefined predetermined operation or in a case where the amount of display time detected by the detection unit 212 for the display of a display pattern is equal to or greater than a preset predetermined amount of time, the saving unit 213 saves the display pattern for the detected time as a desired display pattern.

Specifically, for example in a case where execution of an operation (hereinafter referred to as an "NC operation") in which an operator turns a handle (not shown) on the machine tool 10 during manual measurement (in other words, in a case where the display screen 110 in FIG. 4 is being displayed) is detected by the detection unit 212 as the predetermined operation, the saving unit 213, in the display pattern data 231 corresponding to the operator, automatically saves a display pattern for the plurality of display elements in the display screen 110 in FIG. 4 as a display pattern that is desired in manual measurement. Alternatively, in a case where a setting (hereinafter, may be referred to as a "write process") with respect to NC data, in which a value for workpiece coordinates manually measured in manual measurement is set to a table for workpiece coordinates, is detected by the detection unit 212 as the predetermined operation, in the display pattern data 231 corresponding to the operator, the saving unit 213 may automatically save a display pattern for the display screen 110 in FIG. 4 as the display pattern that is desired in manual measurement.

In addition, for example in a case where an NC operation on an MDI program in an MDI mode is detected by the detection unit 212 as the predetermined operation during automatic measurement (in other words, in a case where the display screen 110 in FIG. 7 is being displayed), in the display pattern data 231 corresponding to the operator, the saving unit 213 may automatically save a display pattern for the plurality of display elements in the display screen 110 in FIG. 7 as a display pattern that is desired in automatic measurement.

Note that, in a case of executing a newly created MDI program, there are many cases where the display element regarding feed shaft speed is caused to be displayed, as illustrated in FIG. 7. However, in a case of executing an MDI program that has been caused to operate at least once before, there are actual results for the MDI program having been safety executed, and thus there are cases where the display element regarding feed shaft speed is not caused to be displayed. In other words, during automatic measurement in a case where the screen 100 in FIG. 6 is being displayed, in a case where an NC operation on an MDI program in an MDI mode is detected by the detection unit 212 as the predetermined operation, in the display pattern data 231 corresponding to the operator, the saving unit 213 may automatically save a display pattern for the display screen 110 in FIG. 6 as a display pattern that is desired in automatic measurement.

In a case where the display pattern is saved by the saving unit 213, the display control unit 211 may display a message such as "the display pattern was saved" on the display unit 220. As a result, the operator can know which display pattern was saved.

The predetermined operation includes an NC operation in which the operator turns a handle (not shown) on the machine tool 10, a write process for setting a value for workpiece coordinates to the table for workpiece coordinates, and an NC operation on an MDI program in the MDI mode, but there is no limitation to these. For example, the predetermined operation may include a write process for setting a tool offset (tool length, tool diameter), setting a value for a custom macro variable, etc., or may include, for example, an NC process that executes a machining program in MEM mode in single block operation.

Note that single block operation is where a machining program is executed one line at a time and then stops. When a signal for a single-block operation mode is detected, the later-described processing monitoring unit 214 may determine that preparatory work (test machining for a first time, confirmation of a machining trajectory in accordance with air cutting, etc.) for a machining program check is being performed.

In addition, the display screen 110 in FIG. 5 is a screen for partway between switching from the display screen 110 in FIG. 4 to the display screen 110 in FIG. 6 or FIG. 7. Because the predetermined operation is not performed, the saving unit 213 does not save the display pattern for the display screen 110 in FIG. 5 as a desired display pattern. However, in a case where the detection unit 212 has detected an amount of display time for the display screen 110 in FIG. 5 that is equal to or greater than the predetermined amount of time, the saving unit 213 may save the display pattern for the display screen 110 in FIG. 5 as a desired display pattern.

Display Pattern Data 231

Figure 8:
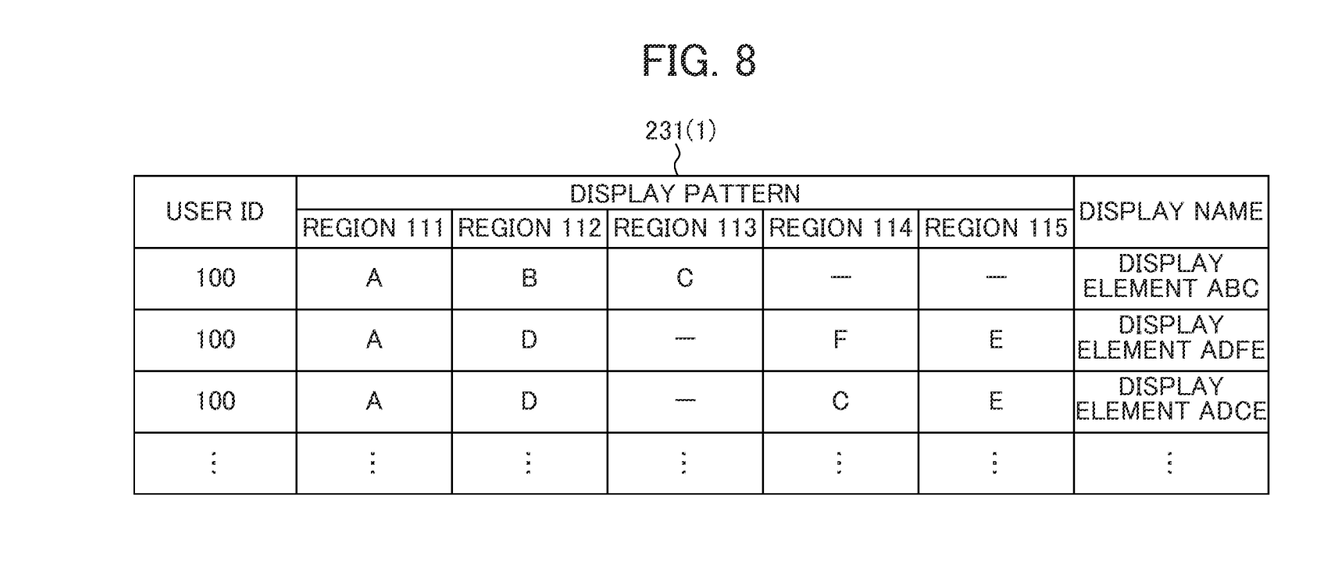
FIG. 8 illustrates an example of display pattern data.

FIG. 8 illustrates an example of the display pattern data 231(1). Note that description is given regarding a case for the display pattern data 231(1), but a case for the display pattern data 231(2) to 231(N) is similar to that for the display pattern data 231(1). In addition, a case where the display screen 110 is divided into three or four regions is indicated in the display pattern data 231 (1), but it is similar for a case in which the display screen 110 is divided into a plurality of screens, with the plurality being two or five or more.

As illustrated in FIG. 8, for example the display pattern data 231(1) includes a "user ID" for an operator who performs preparatory work with respect to the machine tool 10. The display pattern data 231(1) also includes "display pattern" and "display name" which are saved by the saving unit 213 and are for each task, such as manually measuring or automatically measuring workpiece coordinates, included in the preparatory work performed by the operator.

The "user ID" in the display pattern data 231(1) stores an identifier "100" that identifies the operator corresponding to the display pattern stored in the display pattern data 231(1). Note that the "user ID" is not limited to a number, may be characters, or may be a combination of numbers and characters.

The "display pattern" in the display pattern data 231(1) includes "region 111", "region 112", "region 113", "region 114", and "region 115" which respectively indicate the plurality of regions for when the display screen 110 is divided into three or four regions. In "display pattern", for example in a case where the saving unit 213 has saved a display pattern for the display screen 110 in FIG. 4 for manual measurement, based on the identification table 232, the identifier "A" indicating a display element regarding coordinate values is stored in "region 111", the identifier "B" indicating a display element regarding movement axis direction is stored in "region 112", and the identifier "C" indicating a table for workpiece coordinates is stored in "region 113". Note that "–" indicating an empty field is stored in "region 114" and "region 115".

In addition, in "display pattern", for example in a case where the saving unit 213 has saved a display pattern for the display screen 110 in FIG. 7 for automatic measurement, based on the identification table 232, the identifier "A" indicating a display element regarding coordinate values is stored in "region 111", the identifier "D" indicating a display element regarding G code modal is stored in "region 112", the identifier "F" indicating a display element regarding feed shaft speed is stored in "region 114", and the identifier "E" indicating a display element for MDI program editing is stored in "region 115".

Note that, in "display pattern", for example in a case where the saving unit 213 has saved a display pattern for the display screen 110 in FIG. 6 for automatic measurement, based on the identification table 232, it may be that the identifier "A" indicating a display element regarding coordinate values is stored in "region 111", the identifier "D" indicating a display element regarding G code modal is stored in "region 112", the identifier "C" indicating a table for workpiece coordinates is stored in "region 114", and the identifier "E" indicating a display element for MDI program editing is stored in "region 115".

The "display name" in the display pattern data 231(1) stores a name that enables a saved display pattern for a plurality of display elements to be distinguished by an operator. For example, "display ABC", "display ADFE", "display ADCE", etc. may be stored in "display name". In other words, "display ABC" indicates that the display screen 110 is divided into three—the regions 111, 112, and 113, and that displaying is performed for a combination of a display element regarding coordinate values having the identifier "A" in the region 111, a display element regarding movement axis direction having the identifier "B" in the region 112, and a table for workpiece coordinates having the identifier "C" in the region 113.

In addition, "display ADFE" indicates that the display screen 110 is divided into four—the regions 111, 112, 114, and 115, and that displaying is performed for a combination of a display element regarding coordinate values having the identifier "A" in the region 111, a display element regarding G code modal having the identifier "D" in the region 112, a display element regarding feed shaft speed having the identifier "F" in the region 114, and a display element for MDI program editing having the identifier "E" in the region 115.

In addition, "display ADCE" indicates that the display screen 110 is divided into four—the regions 111, 112, 114, and 115, and that displaying is performed for a combination of a display element regarding coordinate values having the identifier "A" in the region 111, a display element regarding G code modal having the identifier "D" in the region 112, a table for workpiece coordinates having the identifier "C" in the region 114, and a display element for MDI program editing having the identifier "E" in the region 115.

Note that "display name" is given as "display ABC", etc., but there is no limitation to this, and characters, numbers, symbols, etc. may be used to make the "display name" be any name that can be distinguished by an operator. In addition, the "display name" may be inputted by an operator via an input unit (not shown) in the control device 20.

The processing monitoring unit 214 monitors processing being executed in the machine tool 10 and the control device 20.

Specifically, it may be that, for example, the processing monitoring unit 214 monitors a task, such as manually measuring or automatically measuring workpiece coordinates, included in the preparatory work and, for example, determines whether the task has ended and whether there is a next task in the preparatory work.

Processing for Saving by Control Device 20

Figure 9:
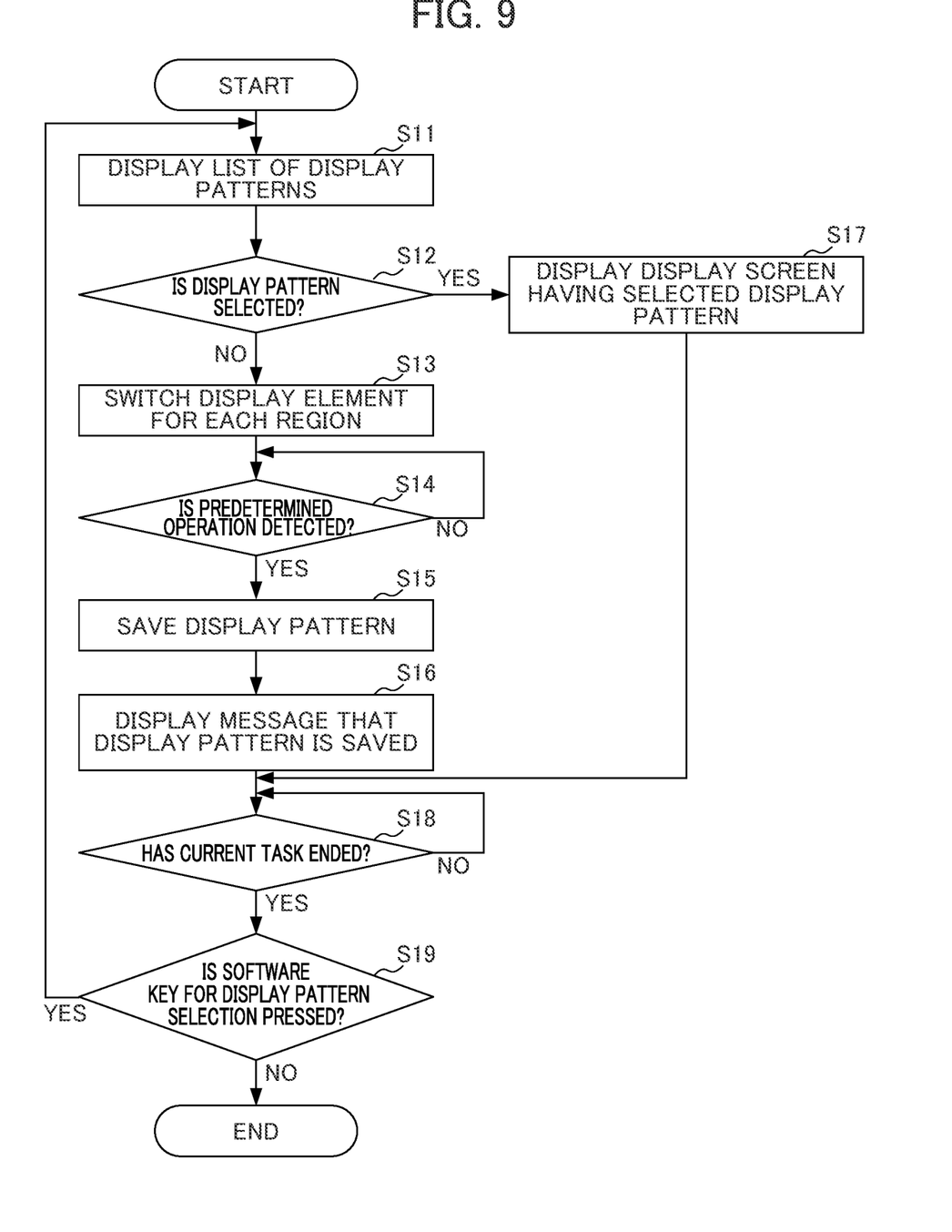
FIG. 9 is a flow chart for describing processing for saving by a control device.

Next, with reference to FIG. 9, a flow of processing for saving by the control device 20 is described.

FIG. 9 is a flow chart for describing processing for saving by the control device 20. The flow illustrated here is executed each time preparatory work is performed.

In Step S11, in a case where an operator has pressed the software key 131(6) for display pattern selection, the display control unit 211, based on the display pattern data 231 corresponding to the operator, uses a list-format screen (not shown) to display, on the display unit 220, display names for display patterns for the display screen 110 that have been saved.

In Step S12, based on an operation by the operator with respect to the software keys 131, the processing monitoring unit 214 determines whether the operator has selected a display pattern corresponding to a task (hereinafter, may be referred to as "current task") which is to be performed and is included in the preparatory work. In a case where a display pattern is selected, the processing proceeds to Step S17. In contrast, in a case where a display pattern is not selected, the display control unit 211 displays, on the display unit 220, the display screen 110 having an initial state or the display screen 110 used in most recent preparatory work. The processing then proceeds to Step S13.

In Step S13, based on an operation by the operator with respect to the software keys 121 and 131, the display control unit 211 divides the display screen 110 into a plurality of regions 111, etc. in accordance with the current task, and switches a display element for each region.

In Step S14, the processing monitoring unit 214 determines whether a predetermined operation with respect to the current task has been detected by the detection unit 212. If a predetermined operation is detected, the processing proceeds to Step S15. In contrast, in a case where a predetermined operation is not detected, the detection unit 212 waits at Step S14 until a predetermined operation is detected.

In Step S15, in a case where a predetermined operation is detected in Step S14, the saving unit 213, in the display pattern data 231 corresponding to the operator, saves the display pattern for the display screen 110 at the time of the detection as a desired display pattern.

In Step S16, the display control unit 211 displays a message that the display pattern has been saved in a message display field (not shown) within the screen 100.

In Step S17, the display control unit 211 displays the display screen 110 having the display pattern selected in Step S12 on the display unit 220.

In Step S18, the processing monitoring unit 214 determines whether the current task has ended. In a case where the current task has ended, the processing proceeds to Step S19. In contrast, in a case where the current task has not ended, the processing waits at Step S18 until the current task ends.

In Step S19, the processing monitoring unit 214 determines whether the software key 131(6) for display pattern selection has been pressed by the operator for a next task in the preparatory work. In a case where the software key 131(6) for display pattern selection has been pressed, the processing returns to Step S11. In contrast, in a case where the software key 131(6) for display pattern selection is not pressed, the processing ends.

By the above, the control device 20 according to one embodiment divides the display screen 110 for preparatory work into a plurality of regions 111, etc., and displays the display screen 110 which respectively includes various display elements such as for coordinate values in the plurality of regions 111, etc. In a case where a predefined predetermined operation such as a write process for, for example, setting a value for workpiece coordinates or an NC operation in an MDI program in an MDI mode is detected in a state where the screen 100 is displayed, the control device 20 saves a display pattern for the display screen 110 at the time when the predefined predetermined operation was detected as a desired display pattern. As a result, the control device 20 can display the display screen 110 that corresponds to an operator without setting the display screen 110 each time preparatory work is performed. The control device 20 can cause the display screen 110 having a desired display pattern to be quickly redisplayed when performing similar preparatory work, and can reduce a burden for an operator.

In addition, because the control device 20 stores only necessary display patterns in the storage unit 230, it is possible to avoid stressing the storage unit 230 and avoid stressing a number of writes over the life of a storage medium.

This concludes the description above regarding one embodiment, but the control device 20 is not limited to the embodiment described above, and include variations, improvements, etc. in a scope that enables the objective to be achieved.

First Variation

In the embodiment described above, in a case where the detection unit 212 has detected the predetermined operation, the saving unit 213 automatically saved the display pattern for the screen 100 at the time when the predetermined operation was detected, but there is no limitation to this. For example, it may be that, in a case where a save instruction for a display pattern is accepted from an operator via an input unit (not shown) in the control device 20, the saving unit 213 saves the display pattern for the display screen 110.

As a result, the control device 20 can reliably save a display pattern desired by an operator.

Second Variation

As another example, in the embodiment described above, the saving unit 213 saved a display name for a display pattern for the display screen 110 in the display pattern data 231, but there is no limitation to this. For example, the saving unit 213 may save, to the display pattern data 231, a thumbnail image for the display pattern together with the display name for the display pattern for the display screen 110.

As a result, an operator can easily find a desired display pattern based on the display name and the thumbnail image.

Third Variation

As another example, in the embodiment described above, functionality for display pattern selection was allocated to the software key 131(6), but there is no limitation to this. For example, it may be that functionality for display pattern selection is not allocated to the software key 131(6). In this case, it may be that, for example when an operator has logged in to the control device 20, when preparatory work is started, or when the processing monitoring unit 214 has detected the end of the current task in preparatory work and detected the start of the next task, the display control unit 211, based on the display pattern data 231 for the operator, uses a list-format screen (not shown) to display, on the display unit 220, display names for display patterns for the display screen 110.

Note that each function included in the control device 20 according to the one embodiment may each be realized by hardware, software, or a combination of these. Being realized by software means being realized by a computer reading and executing a program.

A program can be stored using various types of non-transitory computer-readable mediums and supplied to a computer. A non-transitory computer-readable medium includes various types of tangible storage mediums. An example of a non-transitory computer-readable medium includes a magnetic recording medium (for example, a floppy disk, magnetic tape, or a hard disk drive), a magneto-optical recording medium (for example, a magneto-optical disk), a CD-ROM (read-only memory), CD-R, CD-R/W, and a semiconductor memory (for example, a mask ROM, a programmable ROM (PROM), an erasable PROM (EPROM), a flash ROM, or a RAM). In addition, a program may be supplied to a computer by various types of transitory computer-readable mediums. An example of a transitory computer-readable medium includes an electrical signal, an optical signal, or electromagnetic waves. A transitory computer-readable medium can supply a program to a computer via wired communication channel such as an electrical wire or an optical fiber, or via a wireless communication channel.

Note that steps that express a program recorded to a recording medium of course include processing in chronological order following the order of these steps, but also include processing that is executed in parallel or individually, with no necessity for processing to be performed in chronological order.

To rephrase, the control device and the control method according to the present disclosure can have various embodiments which have configurations such as the following.

(1) The control device 20 according to the present disclosure is a control device that controls the machine tool 10, the control device including: the display control unit 211 that divides the screen 100 to be displayed by the display unit 220 into a plurality of regions, and respectively display display elements pertaining to execution of an operation by the machine tool 10 in the plurality of regions; the detection unit 212 that, in a case of combining and displaying a plurality of display elements, detects an operation by an operator with respect to the machine tool 10 or an amount of display time in which a display pattern indicating the combination of the plurality of display elements is displayed without change; and the saving unit 213 that, in a case where the operation by the operator detected by the detection unit 212 is a predefined predetermined operation or in a case where the amount of display time detected by the detection unit 212 for the display of the display pattern is equal to or greater than a preset predetermined amount of time, saves, as a desired display pattern, the display pattern for a time at which detection was performed.

By virtue of this control device 20, it is possible to display a screen that corresponds to an operator, without setting the screen each time preparatory work is performed.

(2) In the control device 20 according to (1), the saving unit 213 may automatically save the display pattern as the desired display pattern.

As a result, the control device 20 can save a display pattern desired by an operator without imposing a burden on the operator.

(3) The control device 20 according to (1), further including an input unit that accepts an input from an operator, in which the saving unit 213 may save the display pattern based on a save instruction from the operator.

As a result, the control device 20 can reliably save a display pattern desired by an operator.

(4) In the control device 20 according to one of (1) to (3), the saving unit 213 may save by automatically adding a display name that enables at least the plurality of display elements included in the display pattern to be distinguished.

As a result, an operator can select a desired display pattern from a plurality of saved display patterns.

(5) In the control device 20 according to one of (1) to (4), in a case where the saving unit 213 saved the display pattern, the display control unit 211 may display, on the display unit 220, a message that the display pattern was saved.

As a result, the operator can know which display pattern screen was saved.

(6) In the control device 20 according to one of (1) to (5), the predetermined operation may include any one of at least a setting with respect to NC data and execution of an NC operation.

As a result, the control device 20 can save a display pattern for an important screen in preparatory work.

(7) A control method according to the present disclosure is a control method for a display operation in the control device 20 that is realized by a computer that includes the display unit 220 and is configured to control the machine tool 10, the control method including: dividing a screen to be displayed by the display unit 220 into a plurality of regions, and respectively displaying display elements pertaining to execution of an operation by the machine tool 10 in the plurality of regions; in a case of combining and displaying a plurality of display elements, detecting an operation by an operator with respect to the machine tool 10 or an amount of display time in which a display pattern indicating the combination of the plurality of display elements is displayed without change; and in a case where the detected operation by the operator is a predefined predetermined operation or in a case where the detected amount of display time for the display of the display pattern is equal to or greater than a preset predetermined amount of time, saving, as a desired display pattern, the display pattern for a time at which detection was performed.

By virtue of this control method, a similar effect to that for (1) can be achieved.

EXPLANATION OF REFERENCE NUMERALS

1 Control system
10 Machine tool
20 Control device
210 Control unit
211 Display control unit
212 Detection unit
213 Saving unit
214 Processing monitoring unit
220 Display unit
230 Storage unit
231(1) to 231(N) Display pattern data
232 Identification table

The invention claimed is:
1. A control device configured to control an industrial machine, the control device comprising:
a display control unit configured to divide a screen to be displayed by a display unit into a plurality of regions, and respectively display a display element pertaining to execution of an operation by the industrial machine in each of the plurality of regions;
a detection unit configured to, in a case of combining and displaying a plurality of the display elements, detect a user operation with respect to pertaining to execution of the operation by the industrial machine and an amount of display time in which a display pattern indicating the combination of the plurality of the display elements pertaining to execution of the operation by the industrial machine is displayed without change; and
a saving unit configured to, in a case where the user operation pertaining to execution of the operation by the industrial machine, which was detected by the detection unit, is a predefined predetermined operation or in a case where the amount of display time in which the display pattern indicating the combination of the plurality of the display elements pertaining to execution of the operation by the industrial machine has been displayed and which was detected by the detection unit for the display of the display pattern is equal to or greater than a preset predetermined amount of time, automatically save in display pattern data corresponding to a user, as a desired display pattern, the display pattern for a time at which detection was performed without requiring the user to perform an operation for saving a setting.

2. The control device according to claim 1, further comprising:

an input unit configured to accept an input from a user, wherein the saving unit saves the display pattern based on a save instruction from the user.

3. The control device according to claim 1, wherein the saving unit saves by automatically adding a display name that enables at least the plurality of the display elements included in the display pattern to be distinguished.

4. The control device according to claim 1, wherein, in a case where the saving unit saved the display pattern, the display control unit displays, on the display unit, a message that the display pattern was saved.

5. The control device according to claim 1, wherein the predetermined operation includes at least any one of a setting with respect to Numerical Control (NC) data or execution of an NC operation.

6. A control method for a display operation in a control device that is realized by a computer that includes a display unit and is configured to control an industrial machine, the control method comprising:

dividing a screen to be displayed by the display unit into a plurality of regions, and respectively displaying a display element pertaining to execution of an operation by the industrial machine in each of the plurality of regions;

in a case of combining and displaying a plurality of the display elements, detecting a user operation with respect to pertaining to execution of the operation by the industrial machine and an amount of display time in which a display pattern indicating the combination of the plurality of the display elements pertaining to execution of the operation by the industrial machine is displayed without change; and in a case where the detected user operation pertaining to execution of the operation by the industrial machine is a predefined predetermined operation or in a case where the detected amount of display time for the display of the display pattern indicating the combination of the plurality of the display elements pertaining to execution of the operation by the industrial machine is equal to or greater than a preset predetermined amount of time, automatically saving in display pattern data corresponding to a user, as a desired display pattern, the display pattern for a time at which detection was performed without requiring the user to perform an operation for saving a setting.

* * * * *